United States Patent
Enyedi et al.

(10) Patent No.: US 8,842,522 B2
(45) Date of Patent: *Sep. 23, 2014

(54) INCREMENTAL DEPLOYMENT OF MRT BASED IPFRR

(75) Inventors: Gábor Sándor Enyedi, Bekescsaba (HU); András Császár, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 133 days.

This patent is subject to a terminal disclaimer.

(21) Appl. No.: 13/453,876

(22) Filed: Apr. 23, 2012

(65) Prior Publication Data

US 2013/0077476 A1 Mar. 28, 2013

Related U.S. Application Data

(60) Provisional application No. 61/539,598, filed on Sep. 27, 2011.

(51) Int. Cl.
*H04L 12/70* (2013.01)
*H04L 12/735* (2013.01)
*H04L 12/753* (2013.01)

(52) U.S. Cl.
CPC .............. *H04L 45/128* (2013.01); *H04L 45/48* (2013.01)
USPC .......................................... 370/225; 370/256

(58) Field of Classification Search
CPC ......... H04L 45/00; H04L 45/22; H04L 45/28; H04L 2212/0025; H04L 45/48; H04L 45/128; H04W 40/02
USPC .......................................... 370/216, 221, 225
See application file for complete search history.

(56) References Cited

U.S. PATENT DOCUMENTS

2002/0167898 A1* 11/2002 Thang et al. ................... 370/216
2008/0062861 A1 3/2008 Shand et al.

(Continued)

FOREIGN PATENT DOCUMENTS

WO 2010055408 A1 5/2010
WO WO 2010055408 A1 * 5/2010

OTHER PUBLICATIONS

Atlas, A., et al., An Architecture for IP/LDP Fast-Reroute Using Maximally Redundant Trees, internet draft online: http://tools.ietf.org/html/draft-atlas-rtgwg-mrt-frr-architecture-00, Jul. 4, 2011, 27 pages.

(Continued)

*Primary Examiner* — Kevin C Harper
*Assistant Examiner* — Derrick V Rose
(74) *Attorney, Agent, or Firm* — Blakely, Sokoloff, Taylor & Zafman, LLP

(57) ABSTRACT

A method supports incremental deployment of maximally redundant trees-fast reroute (MRT-FRR) by supporting MRT-FRR within an island of nodes in the network. A destination node and next hop failure selected to calculate detour paths. The clean set of nodes is calculated. The clean set of nodes is expanded with extended island candidate nodes that are reachable by a border node within the island via shortest path first (SPF) to the destination node that does not pass through the failed next hop. The extended island candidate nodes that are reachable by the border node within the island via SPF are part of an extended island. An MRT is calculated for each extended island candidate node. A candidate node is selected from the clean set of nodes according to a configured optimization option to serve as the endpoint of detour path to a destination node.

20 Claims, 12 Drawing Sheets

(56) References Cited

U.S. PATENT DOCUMENTS

2010/0080120 A1    4/2010   Bejerano et al.
2013/0016605 A1*   1/2013   Chen ............................ 370/221

OTHER PUBLICATIONS

Leymann, N., et al., "Seamless MPLS Architecture, internet draft available online", http://tools.ietf.org/html/draft-ietf-mpls-seamless-mpls-00, May 29, 2011, 48 pages.

International Search Report and Written Opinion, Application No. PCT/EP2012/004037, dated Dec. 10, 2012, 11 pages.

S. Bryant et al., "IP Fast Reroute Using Notvia Addresses, draft-bryant-shand-ipfrr-notvia-addresses-00.txt," Mar. 2005, 26 pages, Network Working Group, Internet Draft, The Internet Society.

A. Atlas et al., "Algorithms for Computing Maximally Redundant Trees for IP/LDP Fast-Reroute, draft-enyedi-rtgwg-mrt-frr-algorittm-01," Mar. 12, 2012, 46 pages, Routing Area Working Group, Internet-Draft, IETF Trust.

International Search Report and Written Opinion, Application No. PCT/EP2012/004036, dated Dec. 10, 2012, 11 pages.

Tarik Cicic et al., "Redundant Trees for Fast IP Recovery," Sep. 10, 2007, 8 pages.

Muriel Medard et al., "Redundant Trees for Preplanned Recovery in Arbitrary Vertex-Redundant or Edge-Redundant Graphs," Oct. 1999, 12 pages, IEEE/ACM Transactions on Networking, vol. 7, No. 5.

* cited by examiner

INCREMENTAL DEPLOYMENT OF MRT BASED IPFRR

CROSS-REFERENCE TO RELATED APPLICATION

The present application claims priority from U.S. Provisional Patent Application No. 61/539,598, filed on Sep. 27, 2011. Cross-reference is made to a co-pending patent application by Gábor Sándor Enyedi for "OPTIMIZING END-POINT SELECTION OF MRT-FRR DETOUR PATHS" filed on the same date as the present application and commonly owned. The cross-referenced application is incorporated herein by reference.

FIELD OF THE INVENTION

The embodiments of the invention relate to a method and system for supporting an incremental deployment of Maximally Redundant Tree Fast Re-Route (MRT-FRR). Specifically, the embodiments relate to a method and system for MRT-FRR to operate within a group of nodes supporting MRT-FRR to identify a clean set of unimpacted clean nodes in the MRT from which an endpoint of a detour path can be selected based on an administrator configured criteria for evaluating endpoint distances or detour path distances.

BACKGROUND

With the increasing need of service availability for provider networks, protection techniques (also known as Fast ReRoute—FRR) are becoming increasingly important. Unfortunately, Internet Protocol (IP) networks do not provide fast reroute capability other than multi-protocol label switching (MPLS) FRR managed with resource reservation protocol (RSVP). Since building and keeping up MPLS tunnels using RSVP scales poorly in large networks, alternative solutions are needed. Techniques providing protection in pure IP or label distribution protocol (LDP)-MPLS networks are known as IP Fast ReRoute (IPFRR) techniques. Unfortunately, since IP (and LDP) forwards packets to a given destination always following the shortest path, i.e., a path through the network determined using the shortest path first (SPF) algorithm, fast reroute for these networks is difficult.

Only one IPFRR technique, Loop-Free Alternates (LFA), has been implemented by vendors of networking devices. Unfortunately, LFA is a simplest IPFRR method, which cannot cover all the possible failure scenarios. This disadvantage is so serious, many networking device vendors and operators work around the limitations of LFA trying to improve IPFRR failure coverage by organizing the topology of the networks being built to become "LFA friendly" (e.g., Seamless MPLS). Naturally, this results in significant extra expenditure in additional links and networking devices when a network is built, but there is an even more important problem: no matter how carefully a network is designed, a failure immediately ruins its topology, and after the recovery process it is impossible to provide 100% failure coverage since the designed topology is lost. Any network of sufficient size will always contains failed parts, i.e., failed links or nodes, therefore full failure coverage cannot be provided in this way.

SUMMARY

A method is described to be implemented in a node of an island for supporting maximally redundant trees-fast reroute (MRT-FRR) within an island. An island is a subset of a set of nodes in a network that implement MRT-FRR in support of incremental deployment of MRT-FRR in the network. The method includes a set of steps such as selecting a destination node and next hop failure to calculate detour paths to the destination node to avoid the next hop failure. Toc calculate these detour paths a clean set of nodes is determined that is not impacted by the failure of the next hop using MRT within the island. The clean set of nodes is expanded with extended island candidate nodes. Extended island candidate nodes are nodes that are reachable by a border node within the island via shortest path first (SPF) to the destination node, where the SPF does not pass through the failed next hop. The extended island candidate nodes that are reachable by the border node within the island via SPF are part of the extended island. The MRT is calculated for each extended island candidate node. A candidate node is selected from the clean set of nodes according to a configured optimization option.

A node is described to implement the method for incremental MRT-FRR within an island within a network. The node comprising an ingress module configured to receive data packets over the network, an egress module configured to transmit data packets over the network, and a network processor coupled to the ingress module and egress module. The network processor is configured to execute a multi-protocol label switching (MPLS) module or an Internet Protocol (IP) module and an MFT-FRR module. The MPLS module is configured to process MPLS packet forwarding. The IP module is configured to process IP packet forwarding. The MRT-FRR module is configured to select a destination node and a failure in a next hop node, then to calculate a clean set of nodes that are not impacted by the failure of the next hop using MRT within the island. The MRT-FFR module expands the clean set of nodes with extended island candidate nodes that are reachable by a border node within the island via shortest path first (SPF) to the destination node that does not pass through the failed next hop. The extended island candidate nodes that are reachable by the border node within the island via SPF are part of an extended island and an MRT is calculated for each extended island candidate node. The node is configured to select a candidate node from the clean set of nodes according to a configured optimization option where the candidate will serve as the endpoint of a detour path for the destination node and failure node pair.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
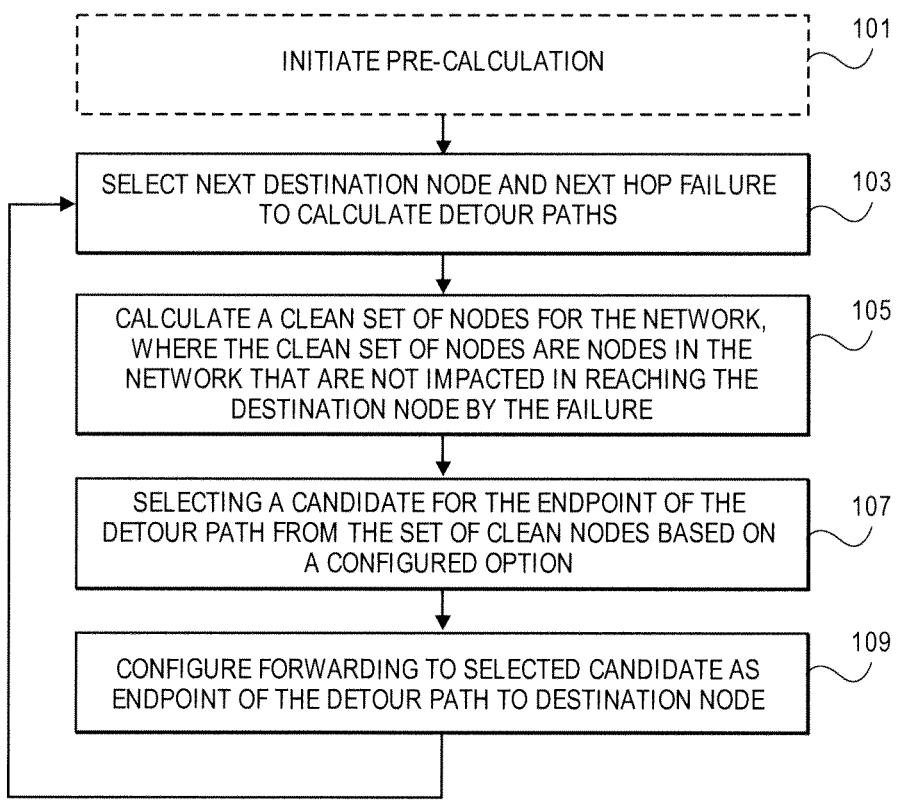
FIG. 1 is a flowchart of one embodiment of a process for pre-calculating endpoints for a maximally redundant tree-fast re-route (MRT-FRR) process.
Figure 2:
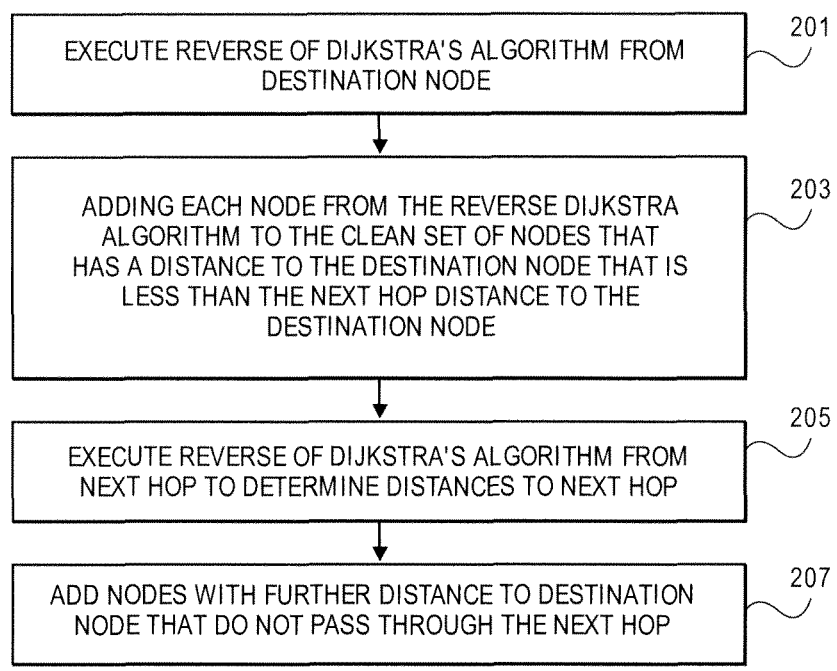
FIG. 2 is a flowchart of one embodiment of a process for generating a set of nodes for endpoint selection.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams in the attached Figures will be described with reference to the exemplary embodiments shown in the attached Figures. However, it should be understood that the operations of the flow diagrams can be performed by embodiments of the invention other than those discussed with reference to the attached Figures, and the embodiments discussed with reference to the diagrams in the attached Figures can perform operations different than those discussed with reference to the flow diagrams of the attached Figures.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. A 'set,' as used herein, refers to any positive whole number of items. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VoIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc. corporate networks over VPNs, IPTV, etc. Typically, subscriber end stations are coupled (e.g., through customer premise equipment coupled to an access network (wired or wirelessly)) to edge network elements, which are coupled (e.g., through one or more core network elements to other edge network elements) to other end stations (e.g., server end stations).

A 'node' as referred to herein is a connection point, either a redistribution point or a communication endpoint (e.g., some terminal equipment) implemented by an electronic device. The node is an active electronic device that is attached to a network, and is capable of sending, receiving, or forwarding information over a communication channel of the attached network.

The embodiments of the present invention provide a method and system for avoiding the disadvantages of the prior art. The disadvantages of the prior art are that previous methods for failure protection are only feasible where an entire network and all of its constituent network elements support MRT-FRR. This delays the implementation due to the cost of replacing or upgrading all of the legacy network elements.

The embodiments of the invention overcome these disadvantages of the prior art. The disadvantage of the prior art are avoided by a process in which routers with MRT FRR capability can be introduced into a network in small, but continuously increasing groups. This creates a set of MRT capable connected sub-areas ("islands"), which are formed by the introduction of these groups of enable routers. If a failure occurs in such an island, MRT can be pre-calculated for use in detour paths. Routers can notify each other about their MRT capability (e.g. using opaque LSA with OSPF); therefore the borders of the islands are well defined and known for all the routers with MRT capability.

In one embodiment, this system relies on providing an MRT endpoint selection mechanism that also achieves short paths with whatever algorithm the MRT itself was computed. After a failure in a network takes place happens, there is still a set of nodes which, with respect to a destination, would not use the failed link or node to reach the destination even with their normal (non-MRT) forwarding. That is, the shortest path used by this set of nodes does not go through the failed link or node. This set of nodes is referred to herein as the "clean" set. The clean set includes, as previously mentioned, the destination node (or egress), otherwise the failure cannot be protected, and the next-next-hop node (if it exists), which is closer to the destination node than the next-hop which has failed. The clean set may include other nodes, too, as discussed further herein below. Any node in the clean set is a candidate node for being the MRT tunnel endpoint of a detour path to the destination node, as any of these nodes in the clean set can take the packet out of the MRT and can forward it towards the destination undisturbed by the failure. The MRT endpoint selection can be optimized based on the distance of the point of local repair, also referred to herein as a source node, and the MRT endpoint (on the used MRT) and the regular distance of the endpoint to the destination (or egress) node.

The present process and system is built on the concept of Maximally Redundant Trees (MRT), which can reach maximum possible failure coverage in any network. A pair of maximally redundant trees is a pair of directed spanning trees of an undirected graph with a common root node, directed in such a way that this root can be reached from each node along both trees, and the two paths from each node towards the root are as disjoint as it is possible given the network topology. This means that from any node, the two paths to the root in each MRT are node-disjoint, if it is possible (there are two such paths), or contains only cut-vertices and cut-edges in common. When there is no failure, MRT based FRR forwards packets along the shortest paths. However, when a failure occurs, MRT-FRR uses MRTs for bypassing the failed node or link. Due to the construction of maximally redundant trees, the root must still be reachable along at least one of the trees, if there was only a single failure, which did not split the network into two. The two trees are often referred to with colours: one of them is blue the other one is red (also showing that there is no kind of priority between these two trees).

IPFRR techniques perform "local" protection, which means that the network needs to handle a failure even if only the immediate neighbours of a failed resource (e.g. the endpoint of a link) knows about the failure, in this way saving the time needed for propagating failure descriptor packets. Packets can be routed to a detour path by the neighbouring nodes. However, nodes further away from the failure still must know that the packet is on a detour path, which is realized by putting the packets into some special tunnel (either IP-in-IP or MPLS for LDP), where the outer destination address (or MPLS label) describes how the packet should be forwarded to the endpoint of the tunnel along either one or the other redundant tree rooted at that endpoint.

There is, however, an important problem with this solution: realizing deployment. For providing protection, all the routers in the network (or at least in the area) must support this kind of FRR technique. This is not a problem for a new network, but operators of existing deployed networks may have serious problems, even if some software upgrade can turn their legacy routers into MRT capable ones. The systems and method discussed herein below enable the realization of incremental deployment with MRT FRR. In a network with only a limited set of MRT capable routers, protection would not be perfect even in this way, but with this method and system some failures can immediately be protected even if there is only a handful of supporting routers.

FIG. 1 is a flow chart of one embodiment of a process for pre-calculating endpoints for detour paths for MRT-FRR. This process can be implemented by a MRT-FRR module in the node that is the point of local repair for a failure in the network or similarly implemented by a node in the network implementing MRT-FRR. In one embodiment, the process can be initiated as a pre-calculation that is scheduled, triggered in response to an event such as detection of low activity, new network topology or neighbour information, a failed neighbour or similar event (Block 101). Thus, this pre-calculation will configure the node to handle data packets to be forwarded to each destination node thereby enabling fast re-routing in the event of a failure. The node will switch to the use of this alternate configuration upon the detection of the associated failure. The process iterates or similarly works through the set of destination nodes to determine detour paths by analysing a set of candidates for endpoints of detour paths for a given failure location and destination node (Block 103). The example is presented as an iteration through the set of destination node and failure node pairs. The failure node is assumed to be a next hop along the shortest path to the destination node as determined using the shortest path first (SPF) algorithm. A destination node can be an aggregate of several other destination prefixes or destination nodes beyond it (e.g., the destination node may be an egress point). The destination node is discussed herein primarily as a single node for sake of clarity. However, one skilled in the art would understand that the principles and structures described herein are also applicable to groupings or aggregates of nodes represented by a destination node.

The process calculates a clean set of nodes for the network, where the clean set of nodes are nodes in the network that are not impacted in reaching the destination node by the failure of the next hop node (Block 105). The process of determining the clean set of nodes is further discussed herein below.

Once the clean set of nodes has been determined, the process can select an endpoint from amongst any of the clean set of nodes (Block 107). The selection criteria can be configured from a set of options by a network administrator, default setting or similar configuration source. The options can include, for example, selecting a candidate node that is on the shortest path first (SPF) path that has a minimal distance to the source node (i.e., the point of local repair). If such a node does not exist, then the candidate can be from an MRT with a minimal distance to the source node. In another option, the SPF nodes are not considered and the selection is made from the nearest MRT nodes in the clean set. In a further option, a node from the clean set (including SPF nodes and MRT nodes) is selected that provides the shortest overall distance between the source node and the destination node when selected as an endpoint for the detour path.

Upon selection of the candidate node, the alternate forwarding of packets to the associated destination node is configured at the source node such that data packets can be forwarded on a detour path to the destination node that utilizes the selected candidate node as the endpoint on the detour path in response to a failure in the network (Block 109). If a failure occurs then this pre-configuration of the nodes is utilized by the source node to forward data packets to the destination node with minimal interruption since the detour routes have been pre-calculated and can simply be loaded or accessed after the failure to implement the detour to the destination node. The specific methods of configuring the source node for forwarding data packets to the destination node is described further herein below in relation to FIGS. 5, 6A and 6B.

Determining the Clean Set

When a source node (S), i.e., a point of local repair, prepares for the failure of a given next-hop node (NH) towards a given destination node (D), the source node (S) first needs to calculate the clean set of nodes for the given destination node (D). This can be done by executing the reverse of Dijkstra's algorithm towards the destination node (D) over the topology of the network (Block 201). This will give the distance from all nodes in the network towards the destination node (D). Each node from the reverse Dijksta algorithm result that has a distance from the destination node (D) that is less than the distance of the next hop node (NH) are added to the clean set of nodes (Block 203).

The clean set of nodes can be further expanded with some additional calculations. There are other nodes that are safe as endpoints, which are closer to the destination node (D) than to the next hop node (NH), but also those which even if they are farther away, do not go through NH.

If for a candidate node (c): the distance between the candidate node and the destination node is greater than the distance between the next hop and the destination node (e.g., dist(c,D)>dist(NH,D)), then c would not qualify as a clean/candidate node according to the previous rules. However, it may still be true that the distance between the candidate node and the destination node is less than the combination of the distance between the candidate node and the next hop and the distance between the next hop and the destination (i.e., dist(c,D)<dist(c,NH)+dist(NH,D) (Block 205). In this case, the path from c to D on the regular shortest path is guaranteed not to touch NH. However, there is considerable weakness in selecting candidates like this: if selecting always a closer node is not necessary, it is possible to form a loop in the case of multiple failures. Therefore, if this is a real problem, it is possible to choose to select an alternative closer node, but since multiple unrelated failures are rare, this tradeoff can be an acceptable one for most network operators.

Another reverse Dijkstra algorithm execution toward the next hop can be used to determine distances to the next hop and those distances can be used to verify that nodes do not pass through the next hop node (NH) and are closer to the destination node (D) (Block 207). The set of nodes produced by the reverse Dijkstra (Block 205) and nodes added with further distance to that set (Block 207) may produce a larger set of candidate nodes encompassing all the candidate nodes of the earlier calculations. In other embodiments, each set of calculations (Blocks 201, 203 and Blocks 205, 207) could be used separately to generate sets of candidate nodes.

Selection of Endpoint

As discussed above, after determining the set of candidate nodes, source node S needs to select one of them as an endpoint. In one embodiment, this process is utilized only to deal with failure cases, which cannot be protected by loop free alternate (LFA), and require MRT and hence an MRT endpoint to be selected.

Any candidate node (c) may be reachable on one or more of the following paths, normal shortest path first (SPF) (if the shortest path from the source node (S) to a candidate node (c) does not go through next hop (NH)), a Red tree (MRT) and a Blue tree (MRT). First, the source node (S) has to check which of these paths cross the failed next (NH) toward the destination (D). For the shortest paths, each can be checked whether one of them crosses the next hop (NH) using distances to the candidate nodes (c). For MRTs, it is possible to follow the paths of each MRT. For MRTs it is guaranteed that one of the paths avoids the NH; selecting the proper path can be done in linear time. Second, the source node (S) checks the distance of each candidate node (c) from the source node (S) along the shortest path, the blue tree and the red tree. Those paths that cross the next hop (NH are ignored from endpoint selection (or their distance is set to infinity).

At this stage, each node candidate node (c) is characterised by the following distances which can be used to select the endpoint: shortest path first distance between the candidate node and the destination node (i.e., $dist_{SPF}(c,D)$); shortest path first distance between the source node and the candidate node (i.e., $dist_{SPF}(S,c)$); distance between the source node and candidate node in the red MRT (i.e., $dist_{RED}(S,c)$); or the distance between the source node and the candidate node in the blue MRT (i.e., $dist_{BLUE}(S,c)$).

In one embodiment, a set of options can be crafted from these distances, where each option can be available for application at the source node to select from the available candidate nodes in the clean set of nodes. A first example, referred to herein as "option 1" assumes that using the MRT is always more expensive than the shortest path, so this option selects that candidate node (c) as an endpoint where $dist_{SPF}(S,c)$ is minimal. If none of the candidates is reachable on the shortest path, then this option 1 selects the candidate (c) with a minimal MRT distance (either from the red or blue tree) between the source node (S) and candidate node (c).

A second example, referred to herein as "option 2," assumes that that if the source node (S) needs to put the packets on special tunnel for detour, then it does not matter whether it is a shortest path detour or an MRT detour, just that the detour path with the nearest candidate node should be utilized. In this option 2, the process selects that candidate (c) as an endpoint for which $\min(dist_{SPF}(S,c), dist_{RED}(S,c), dist_{BLUE}(S,c))$ is minimal, and uses that detour path which gave the minimum. A third example, referred to herein as "option 3," assumes that the only thing that matters in selecting a candidate (c) is that the overall path length to the destination (D) is as short as possible. In this option 3, the process selects that candidate (c) as an endpoint where $(\min(dist_{SPF}(S,c), dist_{RED}(S,c), dist_{BLUE}(S,c)) + dist_{SPF}(c,D))$ is minimal, and uses that path which gave the minimum.

Figure 3:
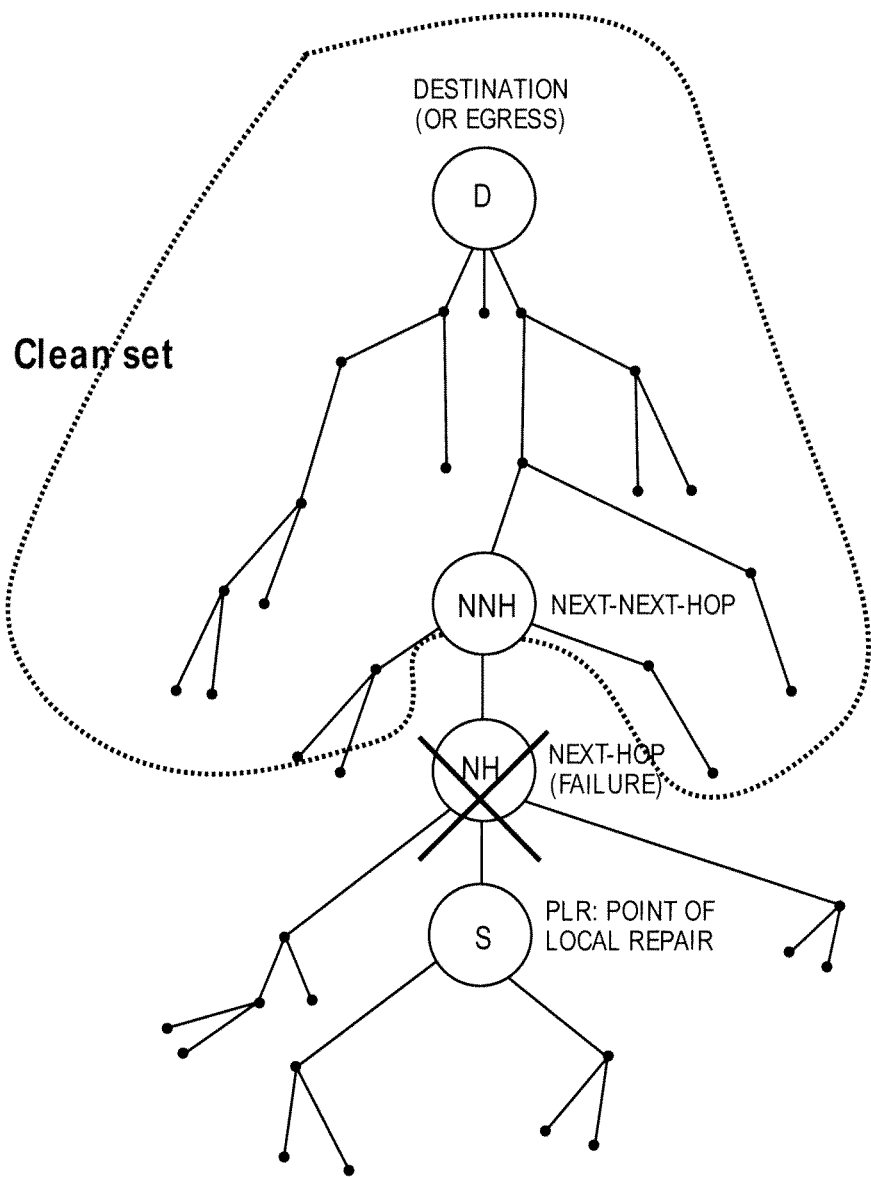
FIG. 3 is a diagram of one embodiment of an example network implementing MRT-FRR.
Figure 4:
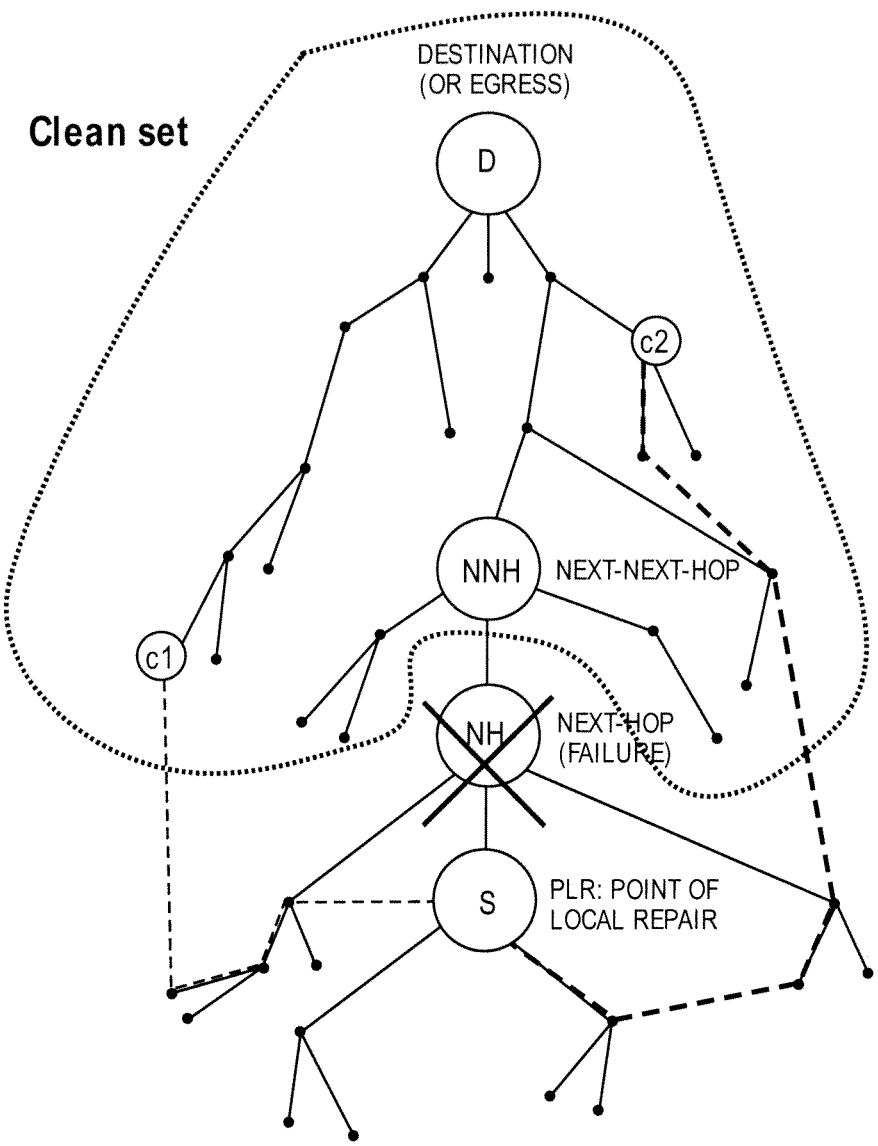
FIG. 4 is a diagram of one embodiment of an example network implementing MRT-FRR showing possible MRT-FRR detour paths.

FIGS. 3 and 4 illustrate an example network and failure scenario. FIG. 3 shows the source node (S) (i.e., the point of local repair) and a destination node (D) are connected through a series of nodes represented as an undirected graph. The failure in the network has occurred at the next hop (NH) signified by an 'X'. The clean set of nodes are those nodes that fall within the dashed line encompassing the next next hop (NNH) and similar nodes in communication with the destination node (D) without having to pass through the failed next hop node (NH). This clean set is determined as described herein above.

FIG. 4 illustrates two possible detour paths for bypassing the failure in the network illustrated in FIG. 3. Candidate node (c1) is closer to the source node (S) than the candidate node (c2). Applying option 2, as described herein above, the process would select candidate node (c1) as the endpoint for a detour path. Overall, however, the path to the destination node (D) through candidate node (c2) is shorter, so option 3 would select c2 as the endpoint for the detour path. A network operator's policy or similar configuration would determine which of the available selection criteria options would be applied to determine the endpoint selection.

Application to IP

In one embodiment, IP encapsulation can be used to put packets into a detour tunnel. This solution allows selecting any candidate node as an endpoint of the tunnel. The outer header destination address is set to the candidate node's address. More specifically, it is set to its "blue" address if the blue MRT is to be used, its "red" address if the red MRT is to be used, or to its normal loopback address if the shortest path can be used.

Figure 5:
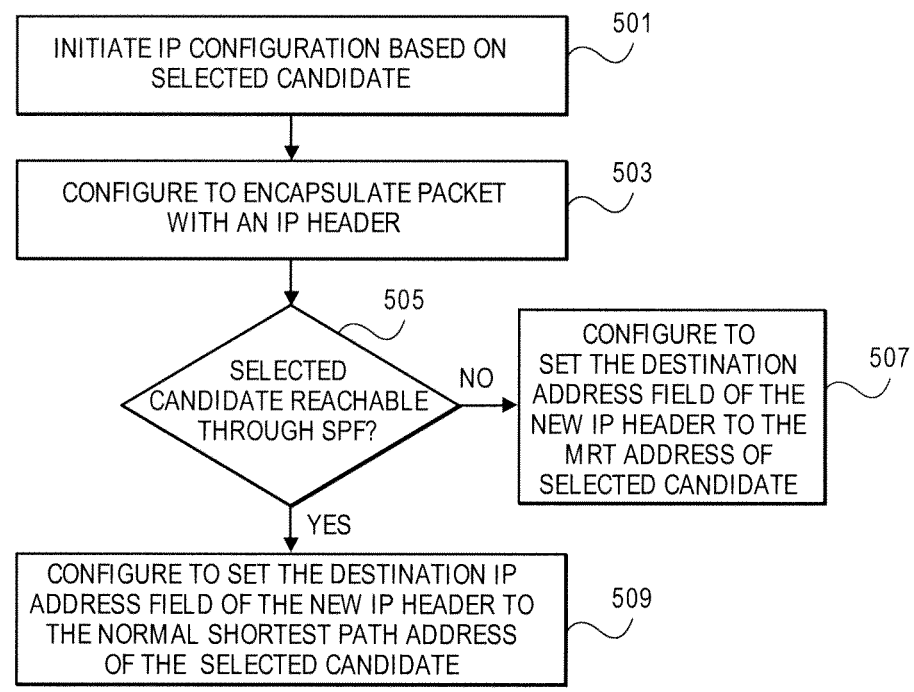
FIG. 5 is a flowchart of one embodiment of a process for handling IP packets on a detour path.

An example IP forwarding configuration process is described in regard to FIG. 5. The process can be initiated after the selection of a candidate node to determine configuration for IP packet forwarding to the selected candidate node (Block 501). This IP configuration process can be called for each candidate node that is determined or evaluated by the node.

The node configures IP packet forwarding for the selected candidate node to enable forwarding of the IP packet to a particular destination node. The node is configured to encapsulate IP packets with an IP header (Block 503). A check is made to determine whether the selected candidate is reachable through SPF after the currently considered failure (Block 505). If the selected candidate node is not reachable through SPF, then the node is configured to set the destination address field of the IP header to the MRT address of the selected candidate. If the selected candidate node is reachable through SPF, then the destination address field of the IP header is configured to be set to the shortest path address of the selected candidate.

Application to LDP-MPLS

As used herein, it is assumed that MPLS is configured with LDP. In one embodiment, where the endpoint is not the destination/egress node (D), but rather a candidate node (c), between the destination node (D) and the source node (S), the source node (S), when seeing that its primary next hop (NH) is unreachable, puts the packet into the tunnel to the selected candidate (c) endpoint. But it also has to make sure that node c will know how to forward the packet.

Figure 6A:
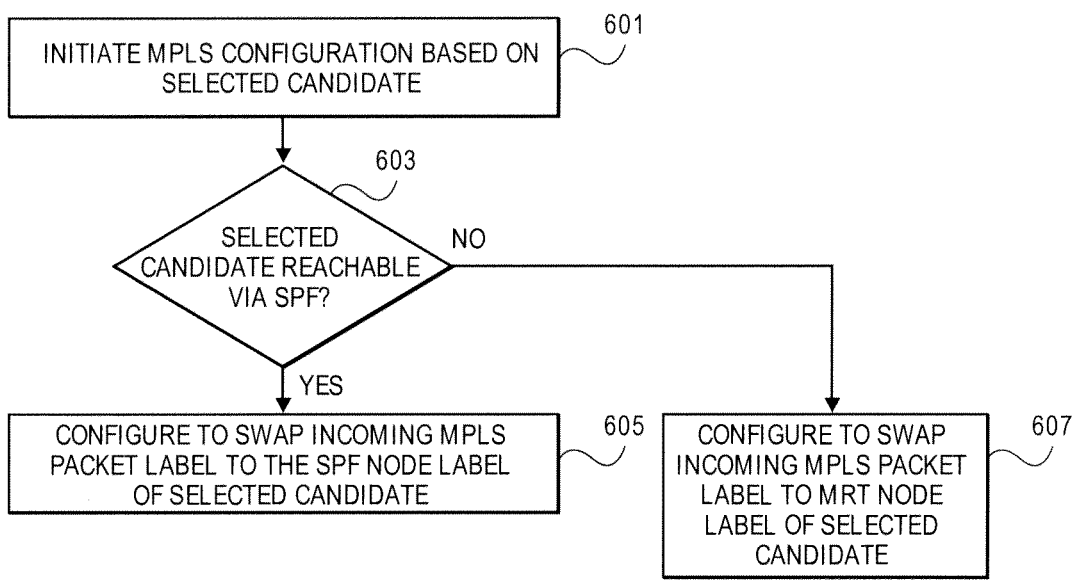
FIG. 6A is a flowchart of one embodiment of a process for handling MPLS packets on a detour path.
Figure 6B:
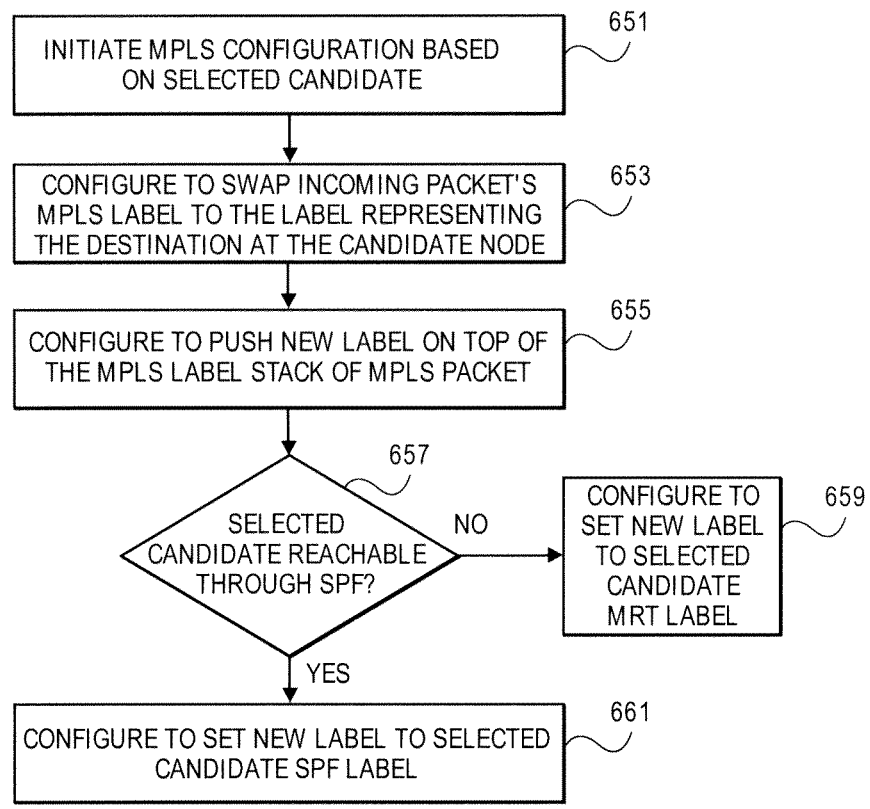
FIG. 6B is flowchart of another embodiment of a process for handling MPLS packets on a detour path.

FIGS. 6A and 6B illustrate example solutions to this issue. The first solution, illustrated in FIG. 6A, is responsive to selecting a candidate node (c) for a detour path to a destination node (D). The MPLS configuration of the node is initiated based on a selected candidate (Block 601).

When it is expected that its primary next hop (NH) is unreachable, the source node (S) is not configured to swap an incoming packet's incoming label to the label for the next hop node (NH), but rather must be configured to swap it to the label for another next hop towards the candidate node (c). As a result, the candidate node will have to perform an IP lookup since MPLS will only provide the path up to the candidate node. First, a check is made to determine whether the selected candidate is reachable via SPF (Block 603). If the selected candidate is not reachable via SPF, then the node is configured to swap incoming MPLS packet labels to use the MRT node label of the selected candidate (Block 607). If the selected candidate is reachable via SPF, then the node is configured to swap incoming MPLS packet labels with the SPF node label of the selected candidate (Block 605).

Another solution is illustrated in FIG. 6B, which is a process to configure the node to preserve MPLS forwarding over the entire path to the destination node (D). In this embodiment, the source node (S) performs label stacking to achieve this end. This process can be initiated to configure MPLS handling for the source node (S) (Block 651).

In this MPLS forwarding embodiment, the source node (S) is configured to set a label that is valid at the candidate node (c) and would lead to the destination node (D) from the candidate node (c), the method of determining this is discussed further herein below (Block 653). The source node (S) can obtain this label via a labelled BGP mesh or through targeted LDP. Using labelled BGP, each node could advertise to remote nodes the labels it uses for reaching forwarding equivalence classes (FECs). For targeted LDP, the binding can be advertised when requested and specifically to those nodes requesting the information.

The node is configured to push a new label onto the MPLS stack of the incoming MPLS packets (Block 655). A check is made whether the selected candidate can be reached through SPF (Block 657). If the selected candidate cannot be reached through SPF, then the node is configured to set the new label to the selected candidate MRT label (Block 659), i.e., to put the packet onto a label switched path that will lead to packet to the candidate on the MRT. If the selected candidate can be reached through SPF, then the node is configured to set the new label the SPF label of the selected candidate node (Block 661), i.e., to put the packet onto a label switched path that will lead to packet to the candidate on a regular shortest path.

Figure 7:
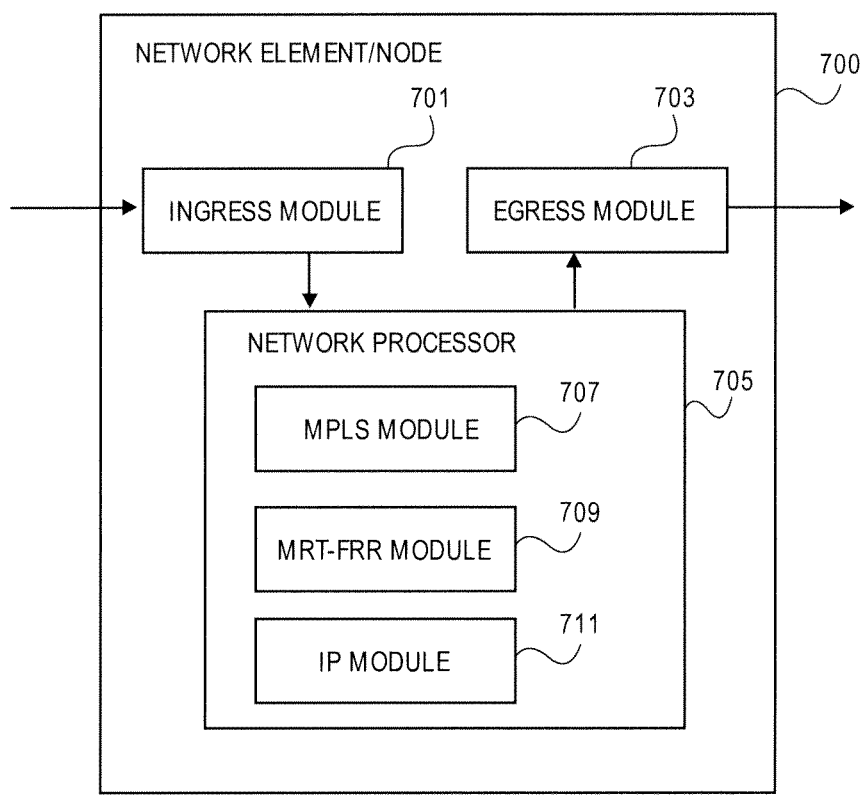
FIG. 7 is diagram of one embodiment of a network element functioning as a node implementing the MRT-FRR.

FIG. 7 is a diagram of one embodiment of a network element or node that performs the functions described herein, such as the functions performed by any source node in a network. The node 700 can include any combination of ingress modules 701, egress modules 703, network processors 705 and similar components and interconnects between such components to enable the functionality described herein above. The node can be any type of routing device or switching device utilized in a wide area network or in similar networks.

The ingress module 701 can be any combination of circuits and processors that received data over a communication link that connects the node 700 with a network and/or other networked devices. The ingress module 701 can process the data received over the communication link at the physical layer level and/or perform higher layer communication processing to facilitate the receipt of data over the communication link and to provide the data to the network processor for further processing. A node can include any number of ingress modules 701.

Similarly, an egress module 703 can be any combination of circuits and processors that transmit data over a communication link that connects the node 700 with a network and/or other networked devices. The egress module 703 can process the data to be transmitted over the communication link at the physical layer level and/or perform higher layer communication processing to facilitate the transmission of data over the communication link and to execute functions at the direction of the network processor. A node 700 can include any number of egress modules 703.

The network processor 705 can be a single processor or set of processors for performing data processing and forwarding in the node. The network processor 705 can also include or work in conjunction with memory devices within the node that store instructions and data necessary to perform routing and similar networking functions. In one embodiment, the network processor executes TCP/IP functions as an IP module 711. Each of these sets of functions can be grouped as a 'module' that is executed by the network processor.

The network processor can also execute an MPLS module 707 and an MRT-FRR module 709. The MPLS module 707 performs the MPLS functions necessary for supporting MPLS data packet forwarding across a network. The MRT-FRR module 709 encompasses the functionality of setting up detour paths in the event of a failure in the network including the above described functions of determining a clean set of nodes and selecting a candidate node from the clean set as the endpoint for the detour path.

The system and method provide setting the MRT-FRR endpoints flexibly, allowing the operator to use relatively short paths for MRT detours according to its policies. The embodiments disclosed herein solve a problem which is in the focus of other vendors in the jointly developed MRT-FRR solution. The solutions described herein may be implemented in any suitable combination of hardware and/or software. In particular embodiments, some or all of the functionality described above may be provided by a processor executing instructions stored on a computer-readable medium, such as a memory. Alternative embodiments of may include additional components beyond those that may be responsible for providing certain functionality, including any of the functionality described above and/or any functionality necessary to support the solution described above.

In one example embodiment, the node can be implemented through a set of control cards and set of linecards. The linecards can implement the functionality of the ingress and/or egress modules described above. A linecard can receive and transmit data packets. The linecards can also process the various protocol layers of the data packets to determine the next hop and similar forwarding information for the data packets. Control cards typically do not directly process data packets. Rather, the control cards configure the linecards to properly forward data packets based on header information and similar information in the data packets. Control packets or control plane data that is received at the node is passed from the linecards to the control cards to enable network control functions such as OSPF, IS-IS, MGP, LDP, RSVP and similar protocols that enable the nodes to discover one another and configure inter-communication. The processes described herein to determine detour paths, clean sets, extended islands and similar routing and control functions can be executed by the control cards and the results used to configure the set of line cards for the node. The linecard can switch to the alternate configuration data calculated by the control card, but already within the data store of the line card, upon detection of a failure in neighboring node or under similar circumstances. This embodiment is provided by way of example and not limitation. One skilled in the art would understand that the functionality in the processes described herein can be distributed across different hardware configurations or similarly regrouped. For example, control of the data plane could be implemented at a central controller using protocols such as OpenFlow or similar protocols. Thus, the control functions can be separated from the forwarding functions and not co-located within the same node.

Conversely, as the computational power of linecards and similar components of nodes increases, the feasibility of calculating detour paths as described herein may enable the calculations to be responsive to detecting failures within neighboring nodes or similarly 'on the fly' rather than pre-calculated. Again, the embodiments provided herein are provided by way of example and not limitation. One skilled in the art would understand that the principles and functions described herein can be implemented in other structures and configurations.

Separated Islands

Based on the methods and systems for optimized endpoint selection, the deployment of such systems is contemplated. It is assumed herein that when MRT-FRR capable nodes (e.g., routers) are deployed, small isolated MRT-FRR capable islands are formed, and those islands do not help each other in protection—if the failure can be handled inside the island, protection is provided, otherwise it is accepted that a failure is a non-protected failure due to the insufficient protection capability of the network. An "island" as used herein refers to a group of interconnected MRT-FRR supporting nodes, such that a path exists between all nodes within an island that does not cross a node that does not support MRT-FRR.

Nodes in a network can notify one another regarding their MRT-FRR support capabilities. This information can be shared using opaque link state advertisements (LSAs) within open shortest path first (OSPF) or similar techniques and protocols for advertising the capabilities of the nodes that support MRT-FRR such that each node can identify whether it is within an island or can form an island with other nodes with MRT-FRR capabilities.

For example, each node (x) considers the MRT-FRR capable island containing it as a network, and computes the MRTs only inside this island. Each node searches for candidates (c) for the endpoint of detour paths in the whole network, but it should be noted that in this case some of these endpoints are not available. For next hops outside the current island, only the shortest path towards them can be utilized, which may cross the next hop (NH) making the candidate unavailable. Accordingly, candidate nodes inside the island have some advantage, since they have three paths between them and each other node in the island (i.e., the source node), but it should be noted that if the next hop (NH) is a cut-vertex of the island (and not the network), even MRTs cannot reach the candidate node.

Basic Outer Candidate Selection

Figure 8:
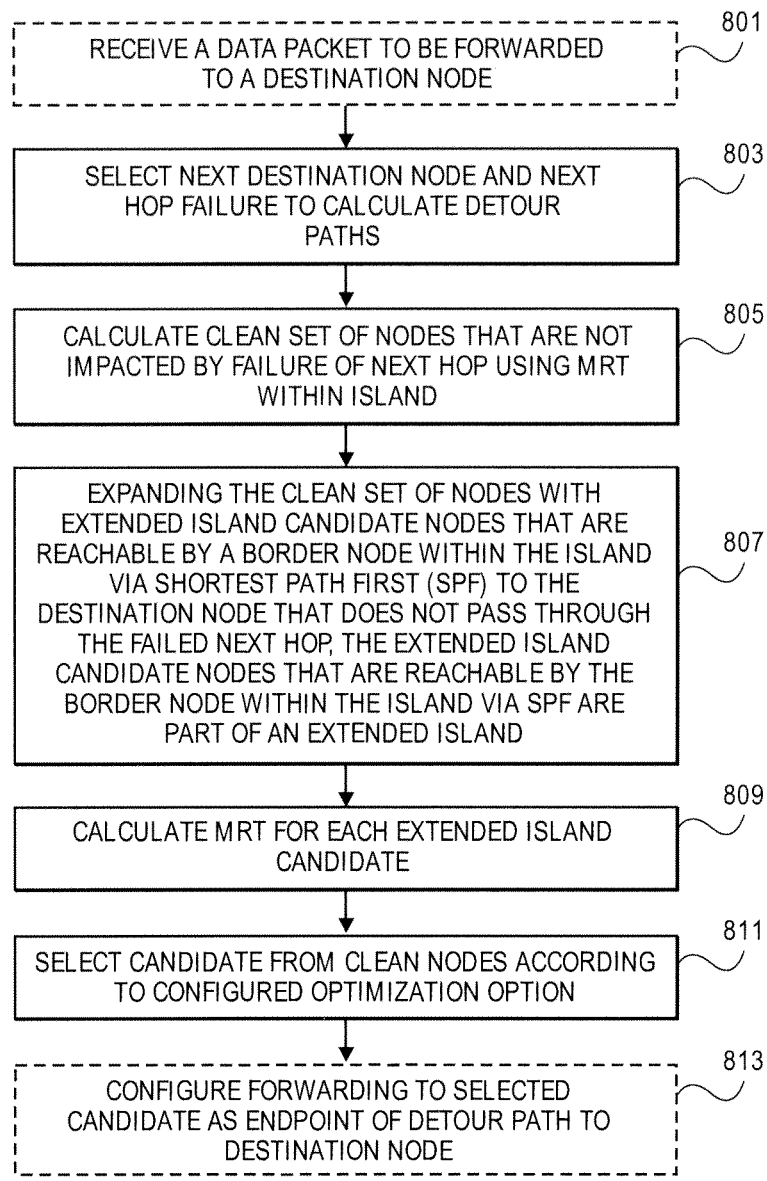
FIG. 8 is a flowchart of one embodiment of the process for incremental MRT-FRR deployment.

In order to improve coverage of the previously discussed scenario, a process is described that provides some basic protection for nodes not in the island containing the failure. The basic idea is that if a packet is pushed out from the island, in which the failure occurred to a node, then in a scenario where the packet never returns to that island again, the packet will reach the candidate node. The process is described in relation to FIG. 8. The idea is depicted in FIG. 9.

Figure 9:
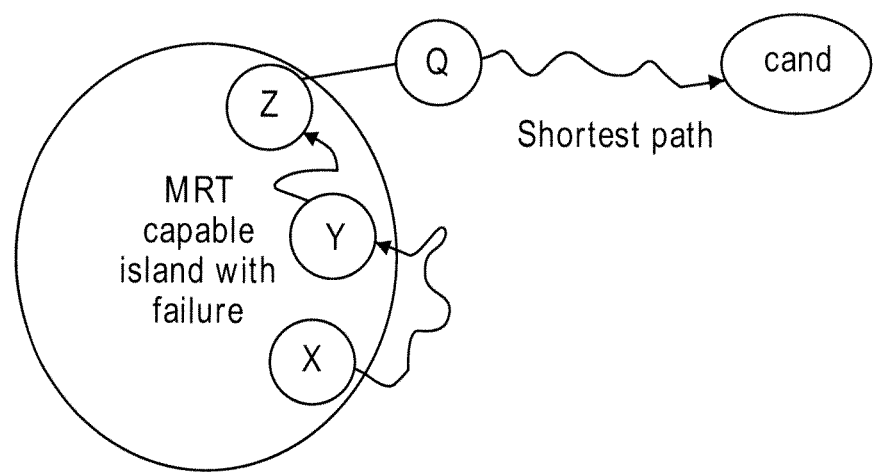
FIG. 9 is a diagram of one example embodiment of an island implementing the MRT-FRR deployment.

In the example illustrated in FIG. 9, an island contains the failure in the network. The island is depicted as a circle including a set of nodes X, Y and Z. The node Z can send the packets out from this island to Q, and from Q these packets can reach the candidate along the shortest path. The node Z is referred to herein as a border node in an island. In one embodiment, the process can be initiated as a pre-calculation (Block 801) step that is scheduled or triggered by an event such as updated neighbor information (e.g., a received LDP or LSA message), low activity in the node or similar event. However, in other embodiments, the process is initiated in response to a local failure within the island or similar event.

The pre-calculation process anticipates potential failures within the island and calculates detour routes to be used at the time of failure. An example is the potential failure of a node in the island that requires the source node to reach Z to ultimately reach a destination node outside the island, for such failures it is necessary to find MRTs to get to Z as well as generate a clean set of nodes for selection of a candidate to serve as an endpoint of a detour path (Block 803). The MRTs are utilized to reach the border node Z, then the packet can be forwarded by the border node to the selected candidate using the shortest paths toward the destination node.

However, the process must also take into account the presence of other nodes such as node X, which can push the packet outside the island too. However, a packet pushed out of the island by X that is following the shortest path will return to the island, e.g., in this example case returning back to the island at node Y. In this example case, node X cannot be used for pushing packets out of the island, because the shortest path can bring the packet back to the same island. As mentioned herein above, the shortest path from node X to the candidate node goes through Y. To avoid such loops, external candidates are virtually connected to border nodes such as node Z.

When the border nodes, which can help packets to leave the island (e.g., here node Z), are found, redundant paths to these nodes must be determined. This can be done by creating an extended island by virtually connecting the candidate node immediately to the border node and by finding a pair of MRTs in this extended area rooted to the candidate node (Block 805). These paths are taken into account when evaluating the candidate nodes from the clean set of nodes.

Figure 11:
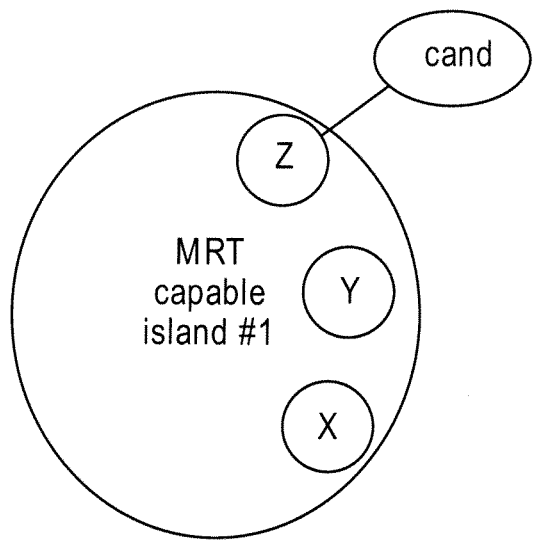
FIG. 11 is a diagram of one embodiment of an extended island.

This case is depicted in FIG. 11. In his example, the candidate being evaluated is virtually connected only to node Z (if there were multiple acceptable island border routers, then the candidate node could be connected to all of them through MRTs), and a pair of MRTs are determined for the extended island candidates tied to that border node. In this example case both paths along the MRTs will cross Z; if there were multiple nodes through which it was possible to leave the island (not only through node Z) this would not be the case.

Figure 10:
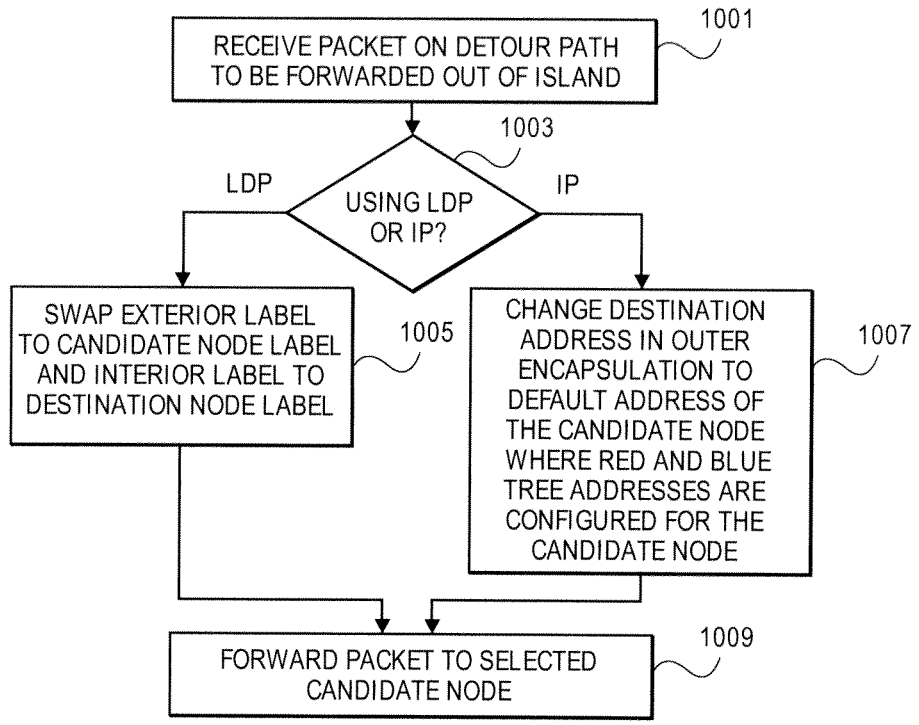
FIG. 10 is a flowchart of one embodiment of a process for packet handling at an extended island border node.

FIG. 10 is a flowchart of one embodiment of a process for handling packets that are leaving the island at a border node such as node Z in the above examples. The process is responsive to receiving a packet on a detour path that is to be forwarded out of the island by the border node (Block 1001). It should be noted, that such a packet was forwarded along an MRT to reach the border node, so the packet needs to be switched back to the shortest path. Therefore, node Z must change the destination address or MPLS label to the one describing forwarding along the shortest path. The method of performing this function is dependent on whether LDP or IP is being utilized (Block 1003).

This label swapping for LDP is relatively straightforward. The exterior label of the MPLS packet is swapped to the candidate node label and an interior label is set to the destination node label (Block 1005). If however pure IP is being utilized for the packet handling, then the destination IP address in the outer encapsulation header is changed to the default address of the candidate node (Block 1007).

Moreover, it is possible, that the candidate node is not an MRT capable node, so it does not have two extra IP addresses automatically. In this special case, the operator may configure two additional IP addresses for this legacy node so that MRT capable routers consistently select one as the default address, one as the address on the blue tree, and one as the address on the red tree. For example, besides the default address the operator configures two additional IP addresses that are higher than the default. In this case, the smallest IP address is the default address, the medium address can be the red address while the highest address can be the blue address—the main point is that each node should handle these addresses consistently.

Inter-Island Protection

Figure 12:
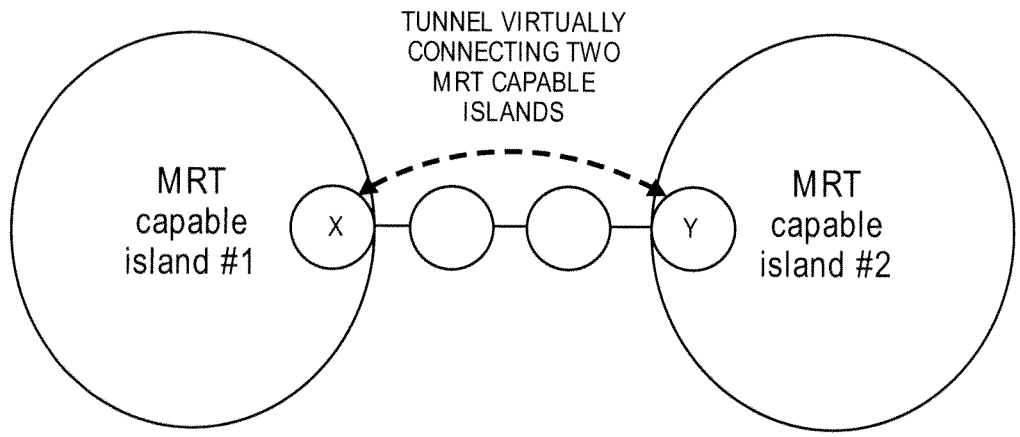
FIG. 12 is a diagram of one embodiment of a super island.

In order to further improve failure coverage, it is beneficial to connect MRT capable islands explicitly with tunnels. This means that border nodes of islands can put the packet into an IP-in-IP (pure IP protection) or MPLS tunnel (LDP FRR), and send them to another island. The concept is depicted in FIG. 12. In this example, there is a node X in the first island and node Y in the second island. Nodes X and Y are two MRT capable nodes, which can reach each other along the shortest paths, using only non-MRT capable nodes in both directions. In this case it is possible to build up a tunnel between them and consider them as immediate neighbors. This unifies the two MRT capable islands.

Uniting MRT capable islands provides the possibility to treat the islands as a single super island, and in this way provides additional failure coverage in the overall network. Since now it is not important if a candidate is in the same MRT capable island or not, if it is MRT capable, it is then possible to find paths along the MRTs in the super island.

Figure 13:
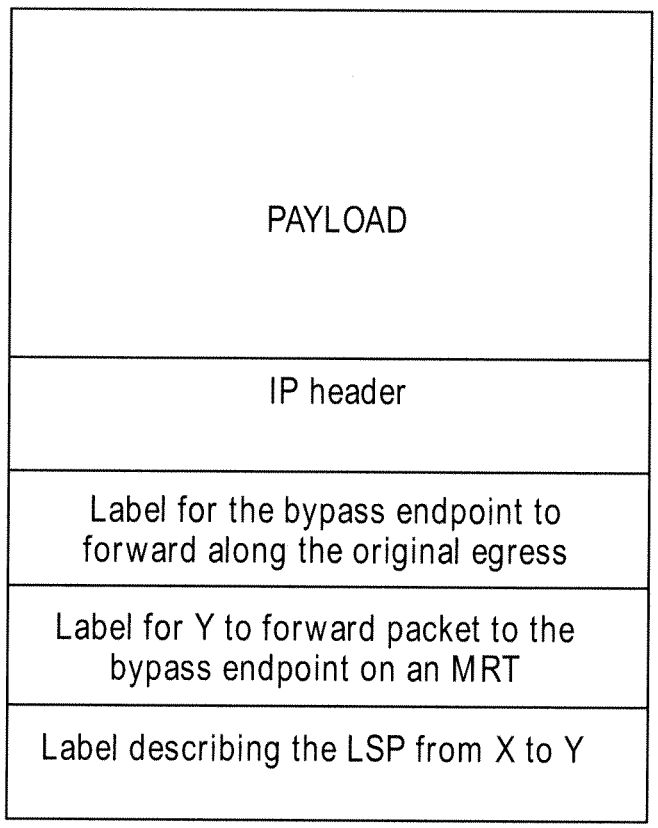
FIG. 13 is a diagram of one embodiment of a header for traffic over the tunnel between islands in a super tunnel.

It should be noted that this kind of connection between islands has its drawbacks. First, applying such tunnels adds another header to the packets, which is an additional level of overhead; second, realizing such tunneling is not simple when there is MPLS applied. When this extra tunneling is provided with MPLS, the same problem is presented again as with the detour inside a single island, i.e. it is necessary to use BGP to tell other nodes which label the endpoint of the detour needs to put packets back to the original LSP. However, this situation differs because node X now needs the label used by node Y for forwarding packets, not along the original LSP, but only to the endpoint of the detour path along one of the MRTs. The header of such a packet used in forwarding packets between node X and node Y is depicted in FIG. 13. In another embodiment, this special MPLS label is not be propagated with standard BGP, but it still requires some minimal modification in the BGP protocol for propagation or the use of similar protocols such as targeted LDP or the like.

Thus, a method, system and apparatus for incremental deployment of MRT based IPFRR is described through which it is possible that limited FRR capability can be reached even in networks where only a few routers support this kind of protection. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented in a node for implementing maximally redundant trees-fast reroute (MRT-FRR) within an island, which is a subset of a set of nodes in a network that implement MRT-FRR in support of incremental deployment of MRT-FRR in the network, the method comprising the steps of:

selecting a destination node and next hop failure to calculate detour paths calculating a clean set of nodes that are not impacted by failure of the next hop within the island, wherein each node in the clean set of nodes is capable of serving MRT tunnel endpoint for a detour path to the destination node;

expanding the clean set of nodes with extended island candidate nodes that are reachable by a border node within the island via shortest path first (SPF) to the destination node that does not pass through the failed next hop, the extended island candidate nodes that are reachable by the border node within the island via SPF are part of an extended island;

calculating MRT for each extended island candidate node; and selecting a candidate node from the clean set of nodes according to a configured optimization option.

2. The method of claim 1, further comprising the step of:
   detecting a packet on a detour path to be forwarded out of the island.

3. The method of claim 2, wherein the packet is a multi-protocol label swapping (MPLS) packet, further comprising the step of:
   swapping an exterior label of the packet to a candidate node label.

4. The method of claim 3, further comprising the step of:
   swapping an interior label of the packet to a destination node label.

5. The method of claim 2, wherein the packet is an IP packet, further comprising the step of:
   changing a destination address in an outer encapsulation of the packet to a default address of the candidate node.

6. The method of claim 5, wherein a red tree address is configured for the candidate node, wherein the candidate node does not support MRT.

7. The method of claim 5, wherein a blue tree address is configured for the candidate node, wherein the candidate node does not support MRT.

8. The method of claim 1, further comprising the step of:
forwarding a packet along to the selected candidate node on a detour route to another island connected by a tunnel to the island.

9. The method of claim 2, further comprising:
forwarding the packet along to the selected candidate node using shortest path first.

10. The method of claim 1, further comprising:
advertising support for MRT-FRR by the node to other adjacent nodes; and
receiving MRT-FRR support advertisements from other nodes in the network.

11. A node implementing maximally redundant trees-fast reroute (MRT-FRR) within an island, which is a subset of a set of nodes in a network that implement MRT-FRR in support of incremental deployment of MRT-FRR in the network, the node comprising:
an ingress module configured to receive data packets over the network;
an egress module configured to transmit data packets over the network; and
a network processor coupled to the ingress module and egress module, the network processor configured to execute a multi-protocol label switching (MPLS) module or an Internet Protocol (IP) module, and an MFT-FRR module,
the MPLS module configured to process MPLS packet forwarding,
the IP module configured to process IP packet forwarding,
the MRT-FRR module configured to select a destination node and a failure in a next hop node, to calculate a clean set of nodes that are not impacted by failure of the next hop within the island where each node in the clean set of nodes is capable of serving as an MRT tunnel endpoint for a detour path to the destination node, to expand the clean set of nodes with extended island candidate nodes that are reachable by a border node within the island via shortest path first (SPF) to the destination node that does not pass through the failed next hop, the extended island candidate nodes that are reachable by the border node within the island via SPF are part of an extended island, to calculate MRT for each extended island candidate node, and configured to select a candidate node from the clean set of nodes according to a configured optimization option.

12. The node of claim 10, wherein the MRT-FRR module is further configured to detect a packet on a detour path to be forwarded out of the island.

13. The node of claim 12, wherein the packet is an MPLS packet, wherein the MPLS module is further configured by the MRT-FRR module to swap an exterior label of a packet to a candidate node label.

14. The node of claim 13, wherein the MPLS module is further configured by the MRT-FRR module to swap an interior label of the packet to a destination node label.

15. The node of claim 12, wherein the packet is an IP packet, wherein the MRT-FRR module is further configured to change a destination address in an outer encapsulation to default address of the candidate node.

16. The node of claim 15, wherein a red tree address is configured for the candidate node, wherein the candidate node does not support MRT.

17. The node of claim 15, wherein a blue tree address is configured for the candidate node, wherein the candidate node does not support MRT.

18. The node of claim 11, wherein the MRT-FRR is further configured to forward a packet along to the selected candidate node on a detour route to another island connected by a tunnel to the island.

19. The node of claim 11, wherein the MRT-FRR module is further configured to forward the packet along to the selected candidate node using shortest path first.

20. The node of claim 11, wherein the MRT-FRR module is further configured to advertise support for MRT-FRR by the node to other adjacent nodes, and to receive MRT-FRR support advertisements from other nodes in the network.

* * * * *

UNITED STATES PATENT AND TRADEMARK OFFICE
CERTIFICATE OF CORRECTION

PATENT NO. : 8,842,522 B2  
APPLICATION NO. : 13/453876  
DATED : September 23, 2014  
INVENTOR(S) : Enyedi et al.

Page 1 of 1

It is certified that error appears in the above-identified patent and that said Letters Patent is hereby corrected as shown below:

On the Title Page, in item (75), under "Inventors", in Column 1, Line 1, delete "Bekescsaba" and insert -- Békéscsaba --, therefor.

On Title Page 2, in item (56), under "OTHER PUBLICATIONS", in Column 2, Line 6, delete "algorittm-01,"" and insert -- algorithm-01," --, therefor.

In the Specification

In Column 4, Line 26, delete "service, etc." and insert -- service, etc.), --, therefor.

In Column 7, Line 4, delete "Dijksta" and insert -- Dijkstra --, therefor.

In Column 7, Line 63, delete "(NH are" and insert -- (NH) are --, therefor.

In Column 12, Line 66, delete "his" and insert -- this --, therefor.

In the Claims

In Column 14, Line 34, in Claim 1, delete "serving MRT" and insert -- serving as an MRT --, therefor.

Signed and Sealed this  
Twelfth Day of May, 2015

Michelle K. Lee  
*Director of the United States Patent and Trademark Office*